June 29, 1948.  J. G. W. MULDER  2,444,204
ION DISCHARGE TUBE
Filed July 8, 1946
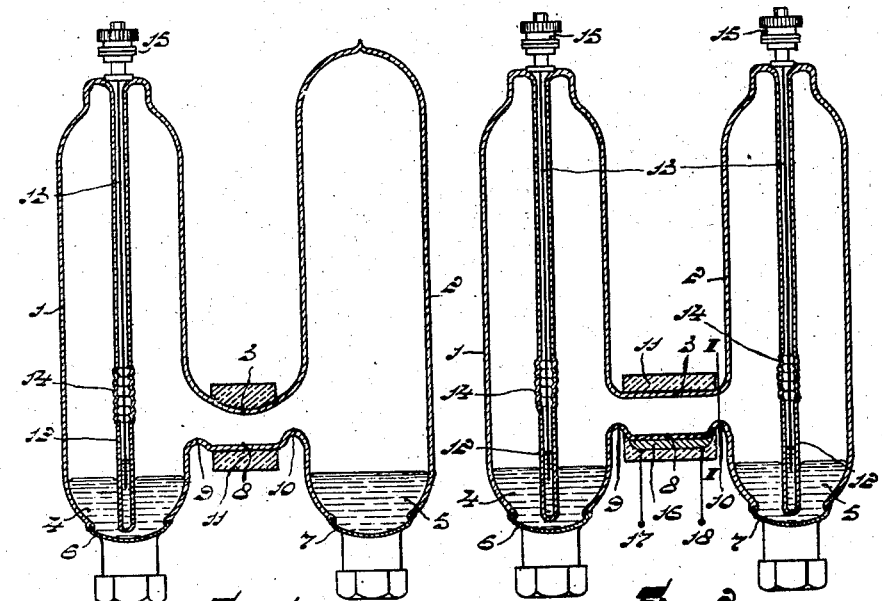
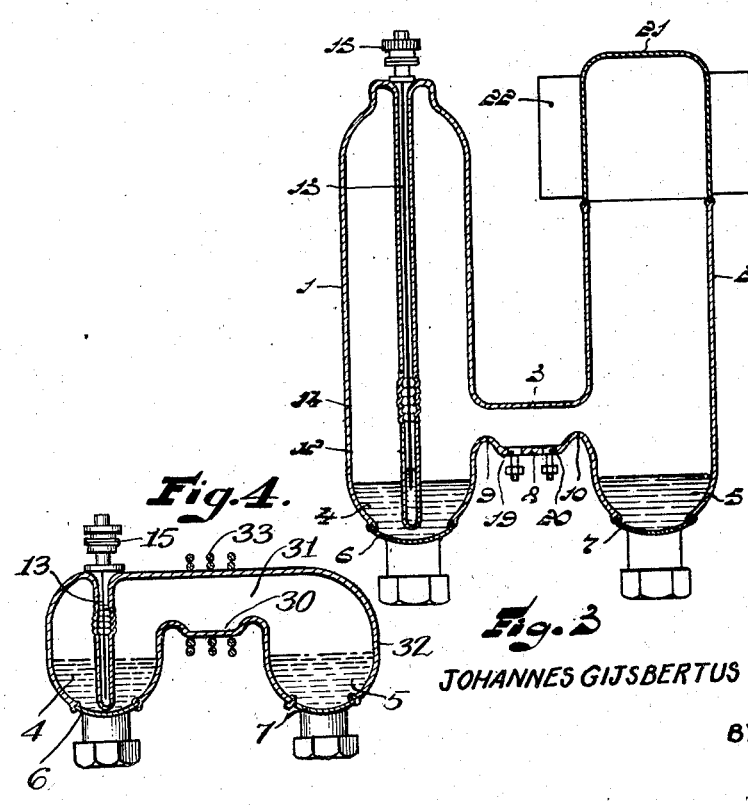
INVENTOR
JOHANNES GIJSBERTUS WILHELM MULDER
BY
ATTORNEY.

Patented June 29, 1948

2,444,204

UNITED STATES PATENT OFFICE 2,444,204

ION-DISCHARGE TUBE

Johannes Gijsbertus Wilhelm Mulder, Eindhoven, Netherlands, assignor to Hartford National Bank and Trust Company, Hartford, Conn., as trustee Application July 8, 1946, Serial No. 681,833
In the Netherlands January 27, 1943

Section 1, Public Law 690, August 8, 1946
Patent expires January 27, 1963

10 Claims. (Cl. 250—27.5)

1

This invention relates to an ion-discharge tube in which the anode as well as the cathode comprise a quantity of liquid metal. The invention particularly relates to an ion-discharge tube having mercury electrodes which is used as a current converting tube or a switch.

Tubes comprising fluid electrodes have the drawback that at the hottest electrode, in most cases the anode, since at the anode the greatest heat is produced, there is a steady vaporization of electrode material which deposits at other places, for example on the other electrode. This may result in a complete vaporization of the liquid metal from the anode, so that solely the anode lead-in serves as an anode, due to which the latter is rendered much too hot and thus the tube soon collapses. With tubes capable of being controlled on two sides, that is to say tubes in which each of the two electrodes comprises an ignition device, it is not permissible for one of the electrodes to become empty or for the mercury level to fall lower than the ignition device, since in this case the electrode cannot serve as a cathode. These tubes frequently contain so much electrode material that the coldest electrode begins to flow over to the hottest before the latter is completely empty. Although the overflowing electrode material is then guided via some dripping device or other, short-circuits or undesirable ignitions are thus frequently involved.

Now, the invention endeavours to avoid these drawbacks in the ion-discharge tube comprising liquid electrodes by providing a container between the two electrodes, which takes up the electrode material overflowing from one of the electrodes. During operation of the tube the electrode material is vaporized again therefrom.

Since the electrode material overflowing from one of the electrodes is taken up by the container located between the two electrodes and is vaporized therefrom again, a conductive connection cannot be established between the two electrodes, so that short-circuiting or undesirable ignition does not occur. The temperature of the vaporizing electrode material must be higher than that of each of the two electrodes, since otherwise electrode material from the anode condenses in them again.

In one preferred form of construction of the switch or current converting tube according to the invention, the two electrodes of mercury are arranged in the limbs of an H-tube or an inverted U-tube, whilst the connecting tube comprises a container for taking up the mercury flowing over from one of the electrodes.

2

For the vaporization of the electrode material from the container use may be made of the heat produced by the discharge. In order to obtain sufficient rapidity of vaporization, the discharge path at the place of the mercury container may be narrowed over a larger or smaller length. It is also possible to surround the container with heat insulating material, so that the evacuation of heat through the wall is limited as much as possible.

In order to ensure the vaporization of the electrode material under unfavourable conditions, it is possible to arrange a heating element outside and adjacent to the container. A vaporization of the mercury by means of direct heating by electric current is also possible. To this end the container may be surrounded by induction coils, or two electrodes may be arranged in the container, by means of which the current is supplied.

If the tube serves as a rectifier it is particularly advantageous to provide the wall of the tube above the anode with an additional cooling, in order thus to promote the supply of the mercury back to the anode.

In order that the invention may be more clearly understood and readily carried into effect, it will now be described more fully with reference to the accompanying drawing.

Fig. 1 shows a rectifying tube according to the invention in which the mercury is vaporized by the heat produced by the discharge.

Fig. 2 shows a discharge tube capable of being controlled on two sides, in which the mercury is vaporized with the aid of a heating element arranged outside the tube.

Fig. 3 shows a rectifier in which two electrodes for the heating of the mercury are arranged inside the container the space over the anode is of such shape that it efficiently dissipates heat.

Fig. 4 shows a rectifier having an inverted U-shaped envelope illustrating a variation of the invention.

In Fig. 1, numerals 1 and 2 indicate the two limbs of the H-tube. The mercury masses 4 and 5 constitute the cathode and the anode respectively. The chrome-iron caps 6 and 7 sealed to the glass serve as current supply members. 3 is the connecting tube comprising at each extremity a rim 9 and 10 respectively, thus forming the container 8. The rim 10 at the anode side is higher than rim 9 at the cathode side, so that mercury overflowing from the cathode cannot spatter into the anode and thus initiate short-circuit or an ignition. The connecting tube 3 is rounded off at its extremities, so that its central section is considerably smaller and hence in the narrowed portion of the discharge path sufficient heat for the vaporization of the mercury is produced. In order to limit the losses of heat to the exterior, tube 3 is surrounded by heat-insulating material 11.

In the cathode mercury is located the spark-ignition electrode constituted by a little quartz tube 12, the inside of which is connected to terminal 15 by means of the mercury and a molybdenum wire 13. The quartz tube 12 is sealed to the glass of the tube by means of intermediate rings 14. For the ignition of the tube a high positive voltage is applied to terminal 15 during a short time.

In Fig. 4 those parts which may be identical with the parts illustrated in Figs. 1 and 2 are indicated by the same reference numerals. A mercury retaining recess 3 is provided in the interconnecting portion 31 of the inverted U-shaped envelope 32. An induction coil 33 is provided to heat and vaporize any mercury caught in the recess 30. The operation of the tube in Fig. 4 is apparent from what has been said heretofore. A mercury pool cathode 4 and anode 5 are provided and also current conductors 6 and 7.

In Fig. 2 the parts corresponding to Fig. 1 are indicated by the same reference numerals as in Fig. 1. The tube has a symmetric shape. Each of the electrodes comprises a spark-ignition electrode and can therefore serve at will as a cathode. The tube is used, for example, for supplying the armature of a direct-current motor which must turn alternately in one or in the other direction, from alternating-current mains. The two overflow rims 9 and 10 are here of equal height, so that each of the electrodes can serve as a cathode. Under the container 8 is arranged the heating element 16 comprising terminals 17 and 18. The size of the element is chosen such that, taking into account the heat produced by the discharge, the mercury will always vaporize. The connecting tube is chosen comparatively narrow throughout its length.

In Fig. 3 also those parts which are identical to Fig. 1 are indicated by the same reference numerals. The bottom of the container 8 has sealed into it two little chrome-iron plates 19 and 20 which serve as electrodes for the heating current of the mercury. The electrodes 19 and 20 must be connected to a low-voltage source of supply to avoid strong sparks on closing and interrupting the current, since these sparks might initiate an ignition of the tube due to the ionization of the mercury vapour. Since the heating of the container takes place only if mercury is present and, consequently, if the container is empty, no over heating occurs, the container may be chosen of such size that all the mercury vaporizes even without the heat produced by the discharge. The connecting tube may in this case be chosen wide, so that there is no unnecessary voltage drop in the tube.

The upper part of the anode half of the tube is constituted by a chrome-iron head 21 comprising cooling fins 22. The heat is rapidly carried off from this part of the tube, so that mercury easily condenses in it and then falls into the anode. If necessary, the head 21 may be cooled, in addition, by an air-current.

What I claim is:

1. An ion discharge tube comprising a liquid anode, a liquid cathode, and an envelope having a cathode containing portion and an anode containing portion and a portion interconnecting said anode and cathode containing portions, said interconnecting portion having a liquid retaining trap.

2. An ion discharge tube comprising a mercury anode, a mercury cathode, and an envelope having a vertically disposed anode containing portion and a vertically disposed cathode containing portion and a portion interconnecting said anode and cathode containing portion, said interconnecting portion communicating with each said anode and cathode containing portions above the level of said anode and cathode respectively and having a liquid retaining recess.

3. An ion discharge tube comprising a mercury anode, a mercury cathode, and an envelope having vertically disposed anode and cathode containing portions and a portion interconnecting said anode and cathode containing portions, said interconnecting portion communicating with said anode and cathode containing portions above the level of said anode and cathode respectively and having a liquid retaining trap, said interconnecting portion having a sufficiently narrow cross-sectional area in the neighborhood of said trap, whereby mercury caught in said trap is vaporized by the heat produced by the passage of current through said interconnecting portion when said tube is in operation.

4. An ion discharge tube comprising a liquid anode, a liquid cathode, an envelope having a cathode containing portion and an anode containing portion and a portion interconnecting said anode and cathode containing portions, said interconnecting portion having a liquid retaining trap, and insulation around said interconnecting portion in the neighborhood of said trap.

5. An ion discharge tube comprising a liquid anode, a liquid cathode, an envelope having a cathode containing portion and an anode containing portion and a portion interconnecting said anode and cathode containing portions, said interconnecting portion having walls defining a liquid retaining recess, and means to heat and thereby to vaporize any liquid caught in said recess.

6. An ion discharge tube comprising a liquid anode, a liquid cathode, an envelope having a cathode containing portion and an anode containing portion and a portion interconnecting said anode and cathode containing portions, said interconnecting portion having walls defining a liquid retaining recess, and a heater element in heat exchange relationship with the walls of said recess.

7. An ion discharge tube comprising a liquid anode, a liquid cathode, an envelope having a cathode containing portion and an anode containing portion and a portion interconnecting said anode and cathode containing portions, said interconnecting portion having a liquid retaining recess, and a pair of electrodes having portions thereof arranged within said recess.

8. An ion discharge tube comprising a liquid anode, a liquid cathode, an envelope having a cathode containing portion and an anode containing portion and a portion interconnecting said anode and cathode containing portions, said interconnecting portion having walls defining a liquid retaining recess, and an induction coil surrounding said recess.

9. An ion discharge tube comprising a mercury anode, a mercury cathode, and an envelope having a vertically disposed anode containing portion and a vertically disposed cathode containing portion and a portion interconnecting said anode and cathode containing portion, said interconnecting portion communicating with each said anode and cathode containing portions above the level of said anode and cathode respectively and having a liquid retaining recess, and cooling means in heat exchange relationship with said envelope in the part of said vertically disposed anode containing portion above said anode.

10. An ion discharge tube comprising a mercury anode, a mercury cathode, and an envelope having a vertically disposed anode containing portion and a vertically disposed cathode containing portion and a portion interconnecting said anode and cathode containing portion, said interconnecting portion communicating with each said anode and cathode containing portions above the level of said anode and cathode respectively and having a liquid retaining recess, said recess having walls on the anode and cathode side thereof, the said wall on the cathode side being lower than the said wall on the anode side whereby liquid retained in said recess will overflow into said cathode.

JOHANNES GIJSBERTUS
WILHELM MULDER.

REFERENCES CITED

The following references are of record in the file of this patent:

UNITED STATES PATENTS

| Number | Name | Date |
|---|---|---|
| 1,118,172 | Arnold | Nov. 24, 1914 |
| 1,121,360 | Hewitt | Dec. 15, 1914 |
| 1,221,034 | De Forest | Apr. 3, 1917 |
| 2,106,857 | Sepian | Feb. 1, 1938 |
| 2,287,541 | Vang | June 23, 1942 |